Figure 1:
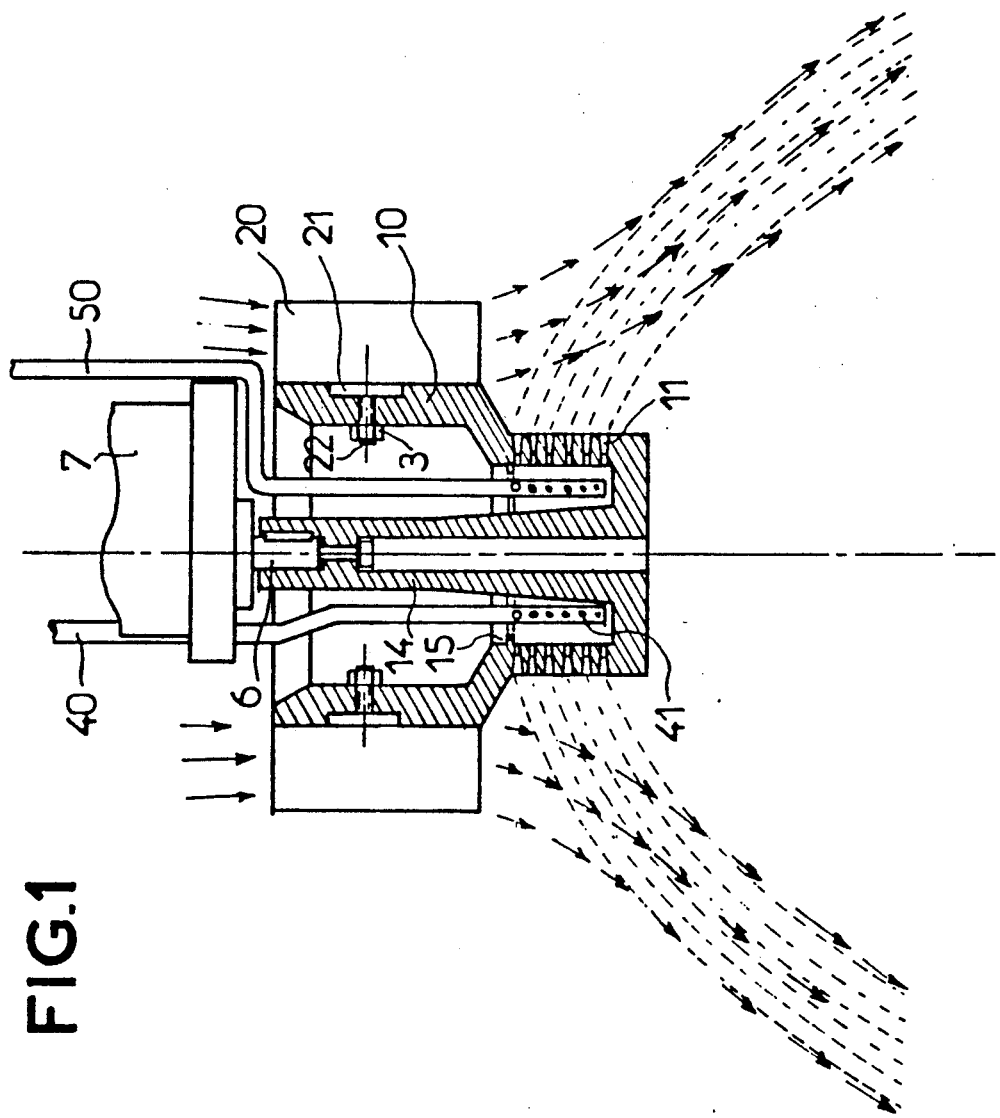

United States Patent [19]
Garet et al.

[11] Patent Number: 5,037,029
[45] Date of Patent: Aug. 6, 1991

[54] CENTRIFUGAL SPRAYING DEVICE WITH CYCLONE AIR FLOW

[75] Inventors: Joëllé Garet; Daniel Bidon, both of Chateau-Thierry, France

[73] Assignee: Airbi Limited Company, Chateau-Thierry, France

[21] Appl. No.: 439,041

[22] PCT Filed: Feb. 24, 1989

[86] PCT No.: PCT/FR89/00073
§ 371 Date: Nov. 7, 1989
§ 102(e) Date: Nov. 7, 1989

[87] PCT Pub. No.: WO89/08504
PCT Pub. Date: Sep. 21, 1989

[30] Foreign Application Priority Data
Mar. 7, 1988 [FR] France .................. 88 03011

[51] Int. Cl.⁵ .................. B05B 3/10; A01M 1/00
[52] U.S. Cl. .................. 239/77; 239/214.15; 239/214.17; 239/214.25; 239/223
[58] Field of Search .............. 239/77, 214.11, 214.13, 239/214.15, 214.17, 214.25, 223

[56] References Cited
U.S. PATENT DOCUMENTS

| | | |
|---|---|---|
| 3,133,702 | 5/1964 | Stelchek . |
| 3,398,893 | 8/1968 | Missimer et al. .................. 239/77 |
| 3,421,697 | 1/1969 | Marks . |
| 3,552,652 | 1/1971 | Greenwood .................. 239/77 |
| 3,719,168 | 3/1973 | Kazee .................. 239/223 |
| 4,741,479 | 5/1988 | Wills et al. .................. 239/214.25 |

FOREIGN PATENT DOCUMENTS

| | | | |
|---|---|---|---|
| 449483 | 5/1974 | Australia | 239/77 |
| 1217119 | 5/1960 | France . | |
| 2464101 | 3/1981 | France . | |
| 2507104 | 12/1982 | France . | |
| 2570959 | 4/1986 | France . | |

Primary Examiner—Andres Kashnikow
Assistant Examiner—Karen B. Merritt
Attorney, Agent, or Firm—Cushman, Darby & Cushman

[57] ABSTRACT

The centrifugal spraying device comprises a fan, a rotating spray unit and a cyclone air flow. It consists essentially of a hollow cylinder, the lower part of which is drilled with spray apertures and whose upper part is provided with flats with recesses against which are fixed blades comprising a cylindrical root extended by a threaded rod provided with a nut. The hollow cylinder is fed by injectors drilled with nozzles and is connected to the output shaft of the drive motor by means of a hollow shaft. The inner wall of the hollow cylinder is separated vertically by a collar located just above the first row of spray apertures. Main application: treatment of crops.

12 Claims, 2 Drawing Sheets

U.S. Patent    Aug. 6, 1991    Sheet 1 of 2    5,037,029

CENTRIFUGAL SPRAYING DEVICE WITH CYCLONE AIR FLOW

BACKGROUND OF THE INVENTION

Field of the Invention

The invention relates to a centrifugal spraying device with a rotating sprayer and a cyclone air flow.

Description of the Prior Art

Numerous centrifugal spraying devices are known at present, particularly for chemical additives for crops.

Some of these devices include vertical or horizontal disks; others use cones by way of which the liquid is expelled by the centrifugal force.

All these devices have the disadvantage of producing fine droplets that penetrate tall crops poorly, and are often carried by the wind outside the surface to be treated.

To overcome this situation, certain manufacturers have had recourse to the addition of a fan to force the droplets to follow a more extended path, which is consequently better aimed at the surface to be treated.

Spraying devices are already known that include a rotating atomization element coupled to an axial fan in such a way as to form a rotating unit with it, such as those described in the following French Patents:

FR A 2 464 101 for a spray device for distributing liquid, particularly chemical additives for crops, which is characterized principally in that the axial fan is located inside a cap of aerodynamic shape intended to control the airflow, so that in use the air current sweeps the rotary atomizer in such a way as to disperse the droplets generated by the atomizer.

FR A 2 507 104 relates to a liquid sprayer device which is distinguished from the preceding one by the fact that one or more paddles are mounted inside the cylinder perforated by the rotary atomizer and are capable of rotating with the cylinder, so as to intercept the liquid and effect an initial fragmentation of its flow as it moves outward from the pin in the perforated cylinder.

The fact that the axial fan is mounted inside a cylindrical cap means that a cylindrical air flow is produced, which counteracts the dispersion of the droplets produced by the rotary atomizer, even though radial rotating paddles are added inside the perforated cylinder.

SUMMARY OF THE INVENTION

Moreover, this concentration in the air flow via a cylindrical fairing means a very pronounced return flow that is subject to drifting, which is precisely what one seeks to avoid.

The centrifugal spraying device with a rotary spray unit and a cyclone air flow according to the invention seeks to overcome the above disadvantages, by solving the problem of combining the production of very fine droplets with those of a cyclone flow of substantially conical shape, assuring the agitation and dispersion of the droplets.

The centrifugal spraying device with a fan, a rotary spray unit and a cyclone air flow according to the invention is characterized principally in that the fan blades are fixed radially about a hollow cylinder in the upper portion thereof, just above the portion perforated with multiple openings comprising the rotary spray unit. This hollow cylinder is connected to its drive motor via a shaft affording a certain flexibility. The recessed outlets of the spray openings are frustoconical. The hollow cylinder is supplied by a number of injectors, corresponding to the diversity of products to be mixed at the moment of spraying.

The portion of the hollow cylinder to which the fan blades are fixed has a diameter greater than that of the portion including the multiple spray openings.

The portion of the hollow cylinder to which the fan blades are fixed has as many flats as there are blades. The distance of the flats from the axis of rotation is approximately 1.5 times the radius of the portion of the hollow cylinder including the spray openings and comprising the rotary spray unit.

The fan blades are connected to the hollow rotor via a cylindrical root kept supported on a countersunk region having a shape and depth corresponding to it in the flat, via a threaded shaft and a self-locking nut. The spacing of the fan blades is adjustable.

The blades include a convex suction face, a concave blade face, an elliptical leading edge and a tapered trailing edge.

The frustoconical portion of the spray openings has a base diameter D corresponding to 1.5 times the diameter d of the inlet opening and a minimum conicity $\alpha$ of 10°.

The length L of the cylindrical portion of the spray openings corresponds to twice the inlet diameter d of the openings. The height of the hollow cylinder to which the blades are fixed represents approximately 0.6 times the total height of the cylinder.

The injectors include multiple nozzles of decreasing cross section toward the end of the injector, distributed over a length corresponding to the height of the portion of the hollow cylinder including the spray openings that comprise the rotary sprayer.

The inside wall of the hollow cylinder includes a collar located just above the portion including the spray openings.

The advantages obtained by this invention are essentially that the droplets produced are finer and better calibrated; the surface area covered can be adjusted by varying the pitch of the blades, with the maximum projection diameter remaining constant regardless of the distance from the target; the multiple injection of different products directly and separately in the sprayer makes it possible to change the treatment as a function of the particular characteristics of the target; the unitary casting of the entire apparatus facilitates assembly and use; and the size is very small compared with other means.

BRIEF DESCRIPTION OF THE DRAWING

Further characteristics and advantages will become apparent from the ensuing description of a spraying device for treating crops embodied according to the invention, given as a non-limiting example, in conjunction with the accompanying drawings, in which:

FIG. 1 is a front view in longitudinal section of the device in operation;

FIG. 2 is a front view of the sprayer;

FIG. 3 is a plan view of the sprayer; and

FIG. 4 is a fragmentary sectional view of the hollow cylinder at the level of a spray opening.

DETAILED DESCRIPTION OF THE PRESENTLY PREFERRED EXEMPLARY EMBODIMENT

The drawings show a hollow cylinder 10 the lower portion of which, comprising the rotary sprayer, is perforated with openings 11 and the upper portion of which includes flats 12 with spot faces 13 against which blades 20 are fixed that include a cylindrical root 21 extended by a threaded rod 22 provided with a nut 3; the hollow cylinder 10 is supplied by injectors 40 and 50 perforated with nozzles 41 and is connected to the output shaft 6 of the drive motor 7 via a hollow shaft 14; the inside wall of the hollow cylinder is separated in the direction of the height by a collar 15 located just above the first row of spray openings 11.

Figure 2:
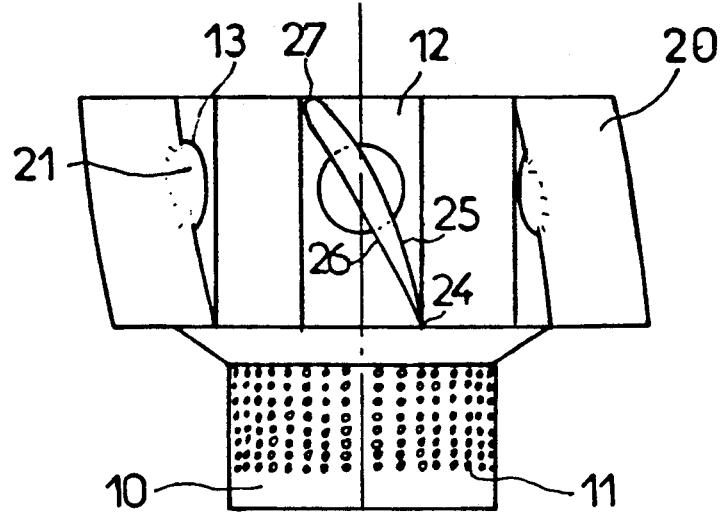
Figure 3:
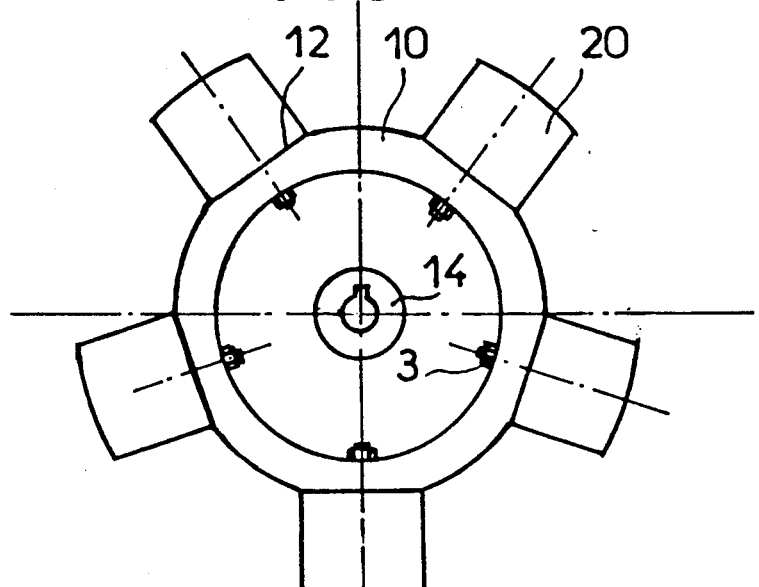
Figure 4:
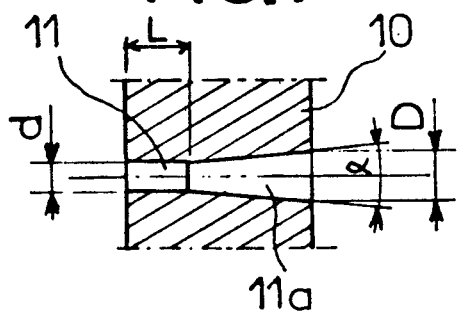

In studying FIGS. 1, 2 and 3, it can be noted that because it has a particular blade shape, the fan is neither axial nor radial but rather comprises a combination of the two, which makes it possible to produce a conical and cyclonic flow. Hence there is a veritable skirt of air that finds its way among the droplets of liquid sprayed to carry them toward the target. The inclination of the blades 20 is adjustable via the threaded rod 22 and the nut 3. The smaller the pitch of the blades, the larger the opening of the cone. It is thus possible to obtain a bell of air with a diameter at the ground of 1.3 m for a distance of 0.5 m.

The product or products to be sprayed are introduced into the hollow cylinder 10 via injectors 40 and 50, which assure a uniform output via nozzles 41. The centrifuging of the mixture of products against the inside wall of the hollow cylinder assures the supply to the spray openings 11 by the formation of a film of decreasing thickness, the upward progression of which is limited by the circular collar 15.

The openings 11 assure the flow of the film of products toward the exterior, while assuring its fragmentation into very fine droplets via the conical portion **11*a***, the angle $\alpha$ of which is approximately 10°, to avoid separation of streams of liquid and obstructions.

At the outlet of the openings 11, the droplets encounter the blast of air produced by the blades 20 and are thus aimed toward the target.

A difference in diameter is adhered to between the lower portion of the hollow cylinder carrying the blades 20 and the portion including the spray openings 11, to assure good interception of the droplets by the air flow. This interception is assured all the more, because the speed of the air flow is greater than that of the droplets.

The cross section of the hollow shaft 14 assuring the drive of the hollow cylinder 10 by the motor 7 is reduced progressively toward the top to maintain a certain flexibility that favors both self-alignment and damping of parasitic vibration.

The cyclonic development of the air flow is promoted by the cross section of the blades 20, which include a convex suction face 25, a concave blade face 26, an elliptical leading edge 27 and a tapered trailing edge 24.

Several sprayers according to the invention may be mounted on one ramp, by maintaining an interval allowing the juxtaposition of projection surfaces, making it possible to treat a very wide swath in a single run.

This sprayer is intended primarily for use in treating crops, but it could also be used, on the condition that minor adaptations are made, to assure the projection of liquid onto surfaces in industrial applications, particularly when for reasons of miscibility or chemical reactions different ingredients cannot be mixed until the moment of spraying.

We claim:

1. A centrifugal spraying device including a rotary sprayer coupled with a fan having a plurality of blades to form a rotary unit, the rotary sprayer comprising:

a hollow cylinder having a wall perforated with multiple openings with recessed outlets, wherein the fan blades are fixed radially about the hollow cylinder in an upper opening thereof to just above the wall perforated with multiple openings, the hollow cylinder being connected to a drive motor via a hollow shaft offering a certain flexibility in that the recessed outlet of the multiple openings is frustoconical and that the hollow cylinder is supplied with a number of injectors corresponding to a diversity of products to be mixed at spraying.

2. The spraying device according to claim 1, wherein a portion of the hollow cylinder on which the fan blades are fixed has a diameter greater than that of the wall perforated with the multiple openings.

3. The spraying device according to claim 1, wherein a portion of the cylinder on which the fan blades are fixed has as many flats as there are blades.

4. The spraying device according to claim 3, wherein the distance of the flats of the blades from the axis of rotation is approximately 1.5 times the radius of the portion of the hollow cylinder including the spray openings and comprising the rotary spray unit.

5. The spraying device according to claim 1, wherein the fan blades are connected to the hollow cylinder via a cylindrical root kept supported in a countersunk region, said countersunk region having a shape and depth corresponding to the root and being formed in the flat, said blades being connected to the hollow cylinder via a threaded rod and a self-locking nut.

6. The spraying device according to claim 1, wherein pitch of the fan blades is adjustable.

7. The spraying device according to claim 1, wherein the blades include a convex suction face, a concave blade face, an elliptical leading edge and a tapered trailing edge.

8. The spraying device according to claim 1, wherein the frustoconical portion of the spray openings has a base diameter and a minimum conicity of approximately 10°.

9. The spraying device according to claim 1, wherein the length of a cylindrical portion of the multiple openings corresponds to twice an inlet diameter of the openings.

10. The spraying device according to claim 1, wherein a height of the hollow cylinder to which the blades are fixed represents approximately 0.6 times a total height of the cylinder.

11. The spraying device according to claim 1, wherein the injectors include multiple nozzles comprising openings of decreasing cross section toward a distal end of the injectors, said openings being distributed over a length of the injectors corresponding to a height of a portion of the hollow cylinder having the multiple openings therein.

12. The spraying device according to claim 1, wherein an inside wall of the hollow cylinder is separated, in the direction of height by a collar located just above a height by a collar located just above a first row of the multiple openings.

* * * * *